Patented July 19, 1932

1,868,300

UNITED STATES PATENT OFFICE

BIRKETT WYLAM AND JAMES STEVENSON WILSON, OF GRANGEMOUTH, STIRLING, SCOTLAND, ASSIGNORS TO IMPERIAL CHEMICAL INDUSTRIES LIMITED, A CORPORATION OF GREAT BRITAIN

DYEING, PRINTING, AND LIKE PROCESS

No Drawing. Application filed September 3, 1931, Serial No. 561,086, and in Great Britain September 2, 1930.

This invention relates to coloring processes including printing, dyeing, stencilling, etc., and in particular it aims at the securing of improved results in such processes by the use of sulphuric esters of cellulose.

According to our invention the coloring process is carried out in the presence of a sulphuric ester of cellulose.

In dyeing with vat colors or with enolic sulphuric ester salts derived from vat dyes or from other suitable quinones, the cellulose sulphuric ester may be added to the dyebath, especially when the padding method, in which the color is vatted after impregnation, is used.

The cellulose sulphuric ester may also be added to reserve printing pastes and to discharge printing pastes.

A preferred embodiment of the invention comprises the addition of a cellulose sulphuric ester to printing pastes, especially to vat dye printing pastes.

By the use of our invention enhanced coloring effects are obtained; e. g. a printing paste of Caledon jade green (Color Index No. 1101) with glycerin, the reducing agent sold under the trade name "Rongalite", sodium carbonate, and the cellulose sulphuric ester gives prints of deeper shade than in the absence of the cellulose sulphuric ester. "Rongalite" is a well known reducing agent. The character of this reducing agent is described in standard technical text-books. (See page 364 of Color Index. Also, page 148 of Bernthsen's Organic Chemistry—1909 edition, and page 58 of Analysis of Dyestuffs by Green—1916.)

Our invention is illustrated but not limited by the following examples in which the parts are by weight.

Example 1

Cellulose ester thickening:
  Cellulose sulphuric ester_____ 50
  Water_____ 50
  ——
  100

Printing paste:
  Soledon jade green single paste\_\_\_\_ 20
  Cellulose ester thickening_____ 78.4
  Sodium nitrite_____ 1.6
  ——
  100.0

(Soledon jade green is the sulphuric ester derived from Caledon jade green;—see Supplement to Color Index.)

The goods are printed with the above paste, dried, steamed for 10 minutes at atmospheric pressure and then passed through a bath of 1 per cent hydrochloric acid to develop the color, rinsed, and soaped at the boil.

Example 2

This is similar to Example 1, except that 8 parts of glycerine are added to the printing paste.

Example 3

Printing paste:
  Caledon jade green double paste\_\_\_ 10
  Cellulose ester thickening_____ 58
  Rongalite (registered trade-mark)\_ 8
  Glycerine_____ 8
  Sodium carbonate_____ 16
  ——
  100

The goods are printed, dried, steamed and then passed through a bath containing 1 per cent of acetic acid and 0.25 per cent of sodium perborate, rinsed, soaped at the boil and dried.

Example 4

This is similar to Example 3, except that Caledon brilliant purple RR double paste is substituted for Caledon jade green.

Example 5

Caledon brilliant purple RR double paste_____ 10
Cellulose ester thickening_____ 80
Glycerine_____ 10
  ——
  100

(Caledon brilliant purple RR is Color Index No. 1104.)

The goods are printed, dried and passed through a bath containing 50 parts of potassium carbonate, 50 parts of sodium hydrosulphite and 400 parts of water. The print is squeezed, aged for 7 minutes with steam at atmospheric pressure and acidified in a bath containing 1 per cent of acetic acid and 0.25 per cent of sodium perborate. It is then rinsed and soaped at the boil.

Example 6

This is carried out in a similar manner to Example 5, except that 50 parts of barium hydroxide are used in the alkaline reducing bath instead of 50 parts of potassium carbonate.

*Example 7*

The goods are printed with the cellulose ester thickening (see Example 1), dried, passed through a 10 per cent solution of barium chloride, rinsed and dried. They are then padded at 60° C. for 30 seconds in a bath containing:—

| | Parts |
|---|---|
| Caledon blue R paste | 25 |
| Water | 400 |
| Caustic soda (flaked) | 6 |
| Sodium hydrosulphite | 3 |
| | 434 |

(Caledon blue R is Color Index No. 1106). The goods are then squeezed and allowed to oxidize in the air, and then finished off with the usual scouring and soaping.

Barium chloride may be replaced by barium hydroxide in the above example.

*Example 8*

| | Parts |
|---|---|
| Caledon brilliant purple RR double paste | 10 |
| Glycerine | 4 |
| Starch (15%) | 15 |
| Cellulose ester thickening | 71 |
| | 100 |

The cotton is printed with the above paste, dried and passed through a cold alkaline hydrosulphite solution containing:—

| | Parts |
|---|---|
| Potassium hydroxide | 50 |
| Sodium hydrosulphite | 25 |
| Water | 425 |
| | 500 |

The goods are then squeezed, steamed damp in an air-free ager from five to seven minutes; oxidized in a bath containing 1 per cent of acetic acid and ¼ per cent sodium perborate solution, rinsed and soaped at the boil.

An equivalent quantity of potassium carbonate may be used to replace the potassium hydroxide in the above example.

*Example 9*

50 parts of cotton cloth are padded in the following:—

| | Parts |
|---|---|
| Cellulose sulphuric ester | 50 |
| Caledon blue R single paste | 25 |
| Nekal BX | 0.5 |
| Water | 600 |
| | 675.5 |

The material is dried and then run through an alkaline hydrosulphite bath at 60° C. consisting of:—

| | Parts |
|---|---|
| Potassium hydroxide | 6 |
| Sodium hydrosulphite | 3 |
| Water | 600 |
| | 609 |

"Nekal BX" is a well known dispersing agent comprising alkyl naphthalene sulphonic acids. (See page 999 of "Melliand Textile Monthly", Vol. III, No. 12, March 1932.)

We claim:—

1. In processes of coloring textile materials, the improvement which comprises applying an organic coloring matter to the materials in the presence of a sulphuric ester of cellulose.

2. In an improved process of printing textile materials the step which comprises applying an organic coloring matter to the materials in the presence of a sulphuric ester of cellulose.

3. The improved process according to claim 2 in which the organic coloring matter is produced on the textile material from an enolic sulphuric ester salt of a vat dye.

4. An improved process of coloring textile materials comprising printing cotton material with a vat dye printing paste containing, in addition to the vat dyestuff and other ingredients, a sulphuric ester of cellulose, treating the material with an alkaline hydrosulphite, and fixing the color by steaming.

5. In processes of coloring textile materials with a vat dye, by the padding method wherein the dye is vatted after impregnation, the improvement which comprises by the addition of a sulphuric ester of cellulose during the padding.

6. An improved printing paste, for printing on textile materials, containing, in addition to the other ingredients, a sulphuric ester of cellulose.

7. An improved discharge printing paste, for printing on textile materials, containing, in addition to the other ingredients, a sulphuric ester of cellulose.

8. An improved reserve printing paste, for printing on textile materials, containing, in addition to the other ingredients, a sulphuric ester of cellulose.

9. A new composition of matter suitable for coloring textile materials by printing, dyeing, stenciling and like processes, said composition comprising an aqueous mixture of a vat dyestuff and cellulose sulphuric ester.

10. A new composition of matter suitable for coloring textile materials by printing, dyeing, stenciling and like processes, said composition comprising a mixture of cellulose sulphuric ester and enolic sulphuric ester salt of a vat dye.

11. An improved printing paste suitable for printing textile materials, said paste comprising Soledon jade green and cellulose sulphuric ester.

12. An improved printing paste suitable for printing textile materials, said paste comprising Soledon jade green, cellulose sulphuric ester, sodium nitrite and water.

13. An improved process of coloring textile materials which comprises applying to the said textile material an aqueous mixture comprising an enolic sulphuric ester salt of a vat dye and cellulose sulphuric ester and then developing the color.

14. An improved process of coloring textile materials which comprises printing said textile material with a printing paste comprising Soledon jade green single paste, cellulose sulphuric ester, sodium nitrite and water, drying the printed material, steaming the printed material at atmospheric pressure and then passing the so treated material through a bath of one per cent hyrochloric acid to develop the color.

In testimony whereof we affix our signatures.

BIRKETT WYLAM, M. Sc., Ph. D.
JAMES STEVENSON WILSON.

CERTIFICATE OF CORRECTION.

Patent No. 1,868,300.                 July 19, 1932.

BIRKETT WYLAM ET AL.

It is hereby certified that error appears in the printed specification of the above numbered patent requiring correction as follows: Page 2, line 103, claim 5, strike out the word "by"; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.

for printing textile materials, said paste comprising Soledon jade green and cellulose sulphuric ester.

12. An improved printing paste suitable for printing textile materials, said paste comprising Soledon jade green, cellulose sulphuric ester, sodium nitrite and water.

13. An improved process of coloring textile materials which comprises applying to the said textile material an aqueous mixture comprising an enolic sulphuric ester salt of a vat dye and cellulose sulphuric ester and then developing the color.

14. An improved process of coloring textile materials which comprises printing said textile material with a printing paste comprising Soledon jade green single paste, cellulose sulphuric ester, sodium nitrite and water, drying the printed material, steaming the printed material at atmospheric pressure and then passing the so treated material through a bath of one per cent hyrochloric acid to develop the color.

In testimony whereof we affix our signatures.

BIRKETT WYLAM, M. Sc., Ph. D.
JAMES STEVENSON WILSON.

CERTIFICATE OF CORRECTION.

Patent No. 1,868,300.                                July 19, 1932.

BIRKETT WYLAM ET AL.

It is hereby certified that error appears in the printed specification of the above numbered patent requiring correction as follows: Page 2, line 103, claim 5, strike out the word "by"; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.

CERTIFICATE OF CORRECTION.

Patent No. 1,868,300.                                          July 19, 1932.

BIRKETT WYLAM ET AL.

It is hereby certified that error appears in the printed specification of the above numbered patent requiring correction as follows: Page 2, line 103, claim 5, strike out the word "by"; and that the said Letters Patent should be read with this correction therein that the same may conform to the record of the case in the Patent Office.

Signed and sealed this 22nd day of November, A. D. 1932.

(Seal)                                             M. J. Moore,
                                                    Acting Commissioner of Patents.